US006193858B1

(12) United States Patent
Hradil et al.

(10) Patent No.: US 6,193,858 B1
(45) Date of Patent: Feb. 27, 2001

(54) SPOUTED BED APPARATUS FOR CONTACTING OBJECTS WITH A FLUID

(76) Inventors: George Hradil; Edward Hradil, both of P.O. Box 478, Harmony, RI (US) 02829-0478

( * ) Notice: Subject to any disclaimer, the term of this patent is extended or adjusted under 35 U.S.C. 154(b) by 0 days.

(21) Appl. No.: 09/216,859

(22) Filed: Dec. 21, 1998

Related U.S. Application Data

(60) Provisional application No. 60/068,498, filed on Dec. 22, 1997.

(51) Int. Cl.[7] ............................ C25D 17/00; C25B 15/00; C25B 9/00; B05B 17/00; B05C 3/02
(52) U.S. Cl. ......................... 204/222; 204/237; 204/240; 204/271; 204/275; 204/276; 204/277; 204/278; 118/303; 118/407; 118/417
(58) Field of Search ............................ 204/198, 201, 204/222, 237, 234, 275, 276, 277, 278, 271, 240; 118/407, 412, 417, 303

(56) References Cited

U.S. PATENT DOCUMENTS

| | | |
|---|---|---|
| 1,789,443 | 1/1931 | Levin . |
| 3,065,153 | * 11/1962 | Hough et al. ............... 204/237 X |
| 3,241,520 | * 3/1966 | Wurster et al. ............... 118/303 X |
| 3,654,098 | 4/1972 | Backhurst et al. ............... 204/20 |
| 3,663,298 | 5/1972 | McCoy et al. ............... 136/31 |

(List continued on next page.)

OTHER PUBLICATIONS

The Annulus of a Spouted Bed as a Three–dimensional Electrode, DŽ. E. Hadžismajlovič, M.G. Pavlovič and K. I. Popov, pp. 393–401, Institute for Chemistry, Technology and Metallugy, University of Belgrade, Njegoseva 12, YU–11000 Belgrade, (Yugoslavia), (No Date).

Primary Examiner—Donald R. Valentine
(74) Attorney, Agent, or Firm—Pollock, Vande Sande & Amernick

(57) ABSTRACT

A vessel for contacting a plurality of objects with a fluid and including at least one bottom wall inclined downwardly from at least one sidewall to an inlet for providing an upwardly directed stream of fluid, and a distribution shield arranged in spaced relation to the bottom wall. The fluid stream causes the objects to flow upward from a moving bed thereof to a disengaging position. The distribution shield has an upper surface inclined downwardly and extending away from the vicinity of the object disengaging position to a return position such that disengaged objects fall on the upper surface of the distribution shield and move downward thereon to the return position from which they fall onto an upper portion of the inclined bottom wall and move downward thereon to a feed position. The vessel may be used for treating objects that are at least partially electrically conductive, wherein the fluid is a liquid electrolyte and the apparatus further includes an electrode positioned to contact the moving bed and a counterelectrode positioned in spaced relation to the moving bed. The vessel may be fixed or portable.

31 Claims, 11 Drawing Sheets

U.S. PATENT DOCUMENTS

| | | | |
|---|---|---|---|
| 3,703,446 | 11/1972 | Haycock et al. | 204/23 |
| 3,756,933 * | 9/1973 | Greenberg | 204/237 X |
| 3,853,094 * | 12/1974 | Christini et al. | 118/417 |
| 3,880,116 * | 4/1975 | Prillig et al. | 118/303 |
| 3,945,892 | 3/1976 | James et al. | 204/1 R |
| 3,981,787 | 9/1976 | James et al. | 204/252 |
| 3,994,796 | 11/1976 | Mayer | 204/223 |
| 4,065,375 | 12/1977 | Newton | 204/237 |
| 4,088,556 | 5/1978 | Pellegri et al. | 204/222 |
| 4,090,927 | 5/1978 | Fresnel et al. | 204/10 |
| 4,171,249 | 10/1979 | Newton et al. | 204/105 |
| 4,182,669 | 1/1980 | Hojyo | 204/213 |
| 4,272,333 | 6/1981 | Scott et al. | 204/23 |
| 4,278,521 | 7/1981 | Kreysa | 204/222 |
| 4,292,144 | 9/1981 | Lepetit et al. | 204/23 |
| 4,316,786 | 2/1982 | Yu et al. | 204/223 |
| 4,330,386 | 5/1982 | Korinek et al. | 204/223 |
| 4,337,135 | 6/1982 | Quinton et al. | 204/213 |
| 4,769,117 | 9/1988 | Shiono et al. | 204/214 |
| 4,822,468 | 4/1989 | Kanehiro | 204/213 |
| 5,164,091 | 11/1992 | Huber et al. | 210/638 |
| 5,203,979 | 4/1993 | Üffinger et al. | 210/272 |
| 5,254,168 | 10/1993 | Littman et al. | 118/666 |
| 5,487,824 | 1/1996 | Griego | 205/128 |
| 5,565,079 | 10/1996 | Griego | 205/67 |
| 5,635,051 | 6/1997 | Salas-Morales et al. | 205/602 |

\* cited by examiner

SPOUTED BED APPARATUS FOR CONTACTING OBJECTS WITH A FLUID

RELATED APPLICATIONS

This application claims the benefit of U.S. Provisional Application No. 60/068,498, filed Dec. 22, 1997, and entitled MOVING BED ELECTRODE FOR REMOVAL OF METAL IONS FROM PROCESS WASTEWATERS.

FIELD OF THE INVENTION

The invention relates to the use of spouted beds of particles, pieces, parts and other small objects for the treatment thereof in a liquid or gaseous fluid. The invention has particular application for the electroplating of small parts which are difficult to plate by conventional means. The invention also has application in the fields of wastewater treatment, electrowinning, electrochemical synthesis, anodic electrochemical smoothing, anodizing, electrophoretic polymer coating, and physical coating, as well as in the general field of spouted bed applications.

BACKGROUND OF THE INVENTION

Barrel plating in which objects are tumbled in a perforated horizontal rotating drum is a common method of electroplating small parts. Representative technology is disclosed in U.S. Pat. No. 4,822,468 by Kanehiro and U.S. Pat. No. 4,769,117 by Shino, et al. Many very small parts cannot be plated effectively in a barrel due to poor contact with the current feeder or fouling on the interior of the drum. These problems often necessitate the addition of plating media (typically some type of smooth metal shot) to the barrel to improve cathodic contacting and part motion.

The use of media significantly increases the required plating time and current because the media is also plated and therefore, the plating cost per part is increased. Additionally, many small parts are fragile or can interlock and may be damaged by tumbling with heavy media. Consequently, these parts cannot be plated successfully in barrels.

U.S. Pat. No. 5,487,824 by Greigo discloses an integrated electroplating system designed specifically to electroplate very small parts which employs a horizontal accelerating rotating drum to maintain a packed bed of parts in motion during electroplating.

U.S. Pat. No. 3,654,098 by Backhurst et al. and U.S. Pat. No. 3,703,446 by Haycock et al. disclose fluidized bed cathodes. Although fluidized beds have excellent liquid-solid contacting, fluidized bed cathodes suffer from poor electrical contact between the fluidized particles, non-homogeneous electrical potentials and particle segregation effects. Additionally, it is difficult to maintain the entire bed fluidized when the particles are changing in size, and possibly density, due to metal deposition. It is unlikely that the potential benefits of the fluidized bed approach will be realized in a practical electrodeposition system.

Typical spouted beds consist of a cylindrical vessel with a conical bottom section. The vessel contains a bed of particles which form the spouted bed. Fluid is introduced into the spouted bed vessel at the bottom of the conical section as a jet. This fluid jet penetrates the bed of particles contained in the spouted bed vessel, entraining particles and forming a "spout" of upward moving particles and fluid. The particles disengage from the fluid flow in a region above the particle bed and then fall on top of the downward-moving annular bed. The "pumping action" provided by the spout circulates the particles through the vessel in a torroidal fashion; upwards in the spout and downwards in the annular moving bed. A "draft pipe" may be incorporated into the vessel to assist in the fluid transport of the particles. The draft pipe consists of a tube which is fixed coincident with the location of the spout, directly above and aligned with the liquid jet. The draft pipe delays the dispersion of the liquid jet and allows particle transport over a broader range of fluid velocities while also stabilizing the liquid flow.

U.S. Pat. No. 4,272,333 by Scott discloses the use of a moving bed electrode (MBE), in which conductive particles move downward vertically in a packed bed between two electrodes, the anode being shielded with a membrane. The necessity of using a membrane to shield the anode makes this configuration less attractive for practical applications, since the mechanical abrasion of the moving bed of particles can damage the membrane in a short time. Additionally, metal deposition on the membrane may be a complication.

An article by Hadzismajlovic et al. published in *Hydrometallurgy*, Vol. 22, pages 393–401 (1989), and U.S. Pat. No. 1,789,443 by Levin disclose the use of spouted bed cathodes with anodes suspended above the spouted bed surface. Although this configuration may eliminate the complication of shielding electrodes using membranes, several operational problems may be encountered with this configuration. Many electrolytes have poor electrical conductivity; therefore, it is advantageous to have the cathode and anode in close proximity in order to reduce the voltage drop over the cell. This cannot be accomplished in these prior art systems, since the spout would collide with the anode. Additionally, the projected spouted bed geometric surface area is very limited, impairing electrode performance.

Conventional spouted beds also suffer from a particle recirculation problem commonly referred to as "dead spots", where a portion of the particle bed is stagnant. Dead spots usually exist at the outer edge of the spouted bed surface and are attributable to a failure of the spout to deposit particles at the circumference of the spouted bed. In an attempt to remedy this problem, spouted beds with very steep bottom cone angles have been adopted. In all cases, the radius of the spouted bed has been strictly limited to the distance to which particles in the spout can be transported radially outward by the fluid flow.

SUMMARY OF THE INVENTION

In the present invention, a distribution shield consists of a solid conical section extending from the vicinity of the upper edge of a draft pipe downward and radially outward towards the vessel sidewall above or beyond the outer edge of a downwardly moving packed bed surface, and is used to convey parts, pieces, particles or other small objects to the outer edge of the spouted bed by preventing the objects from falling near the center of the spouted bed surface. Instead, the objects disengage from the spout and are deposited on the upper surface of the distribution shield. The objects then move along the top surface of the distribution shield until they are deposited at or beyond the outside edge of the moving bed surface.

Use of the distribution shield totally eliminates stagnant areas at the circumference of the spouted bed. Moreover, the distribution shield allows very large diameter spouted beds to be constructed at modest fluid flow rates, since it is no longer necessary to transport objects to the spouted bed circumference dynamically via the fluid flow. Additionally, when a distribution shield is used, large diameter shallow spouted beds with shallow bottom cone angles may be employed. In this type of bed, the motion of the objects is more radially inward rather than downward. This type of spouted bed is particularly advantageous for circulating fragile objects where the weight of a deep bed may crush or break the objects and is particularly useful for spouted beds of conductive or partially conductive parts used as high performance electrodes where large projected areas and shallow bed depths are desirable.

A portable electroplating apparatus, which incorporates a pump and a vessel which defines a spouted bed electrolytic reaction chamber, is also provided by the present invention. The portable electroplating vessel can be conveyed from process tank to process tank by hand, automated plating system, or hoist. The spouted bed vessel is mounted on a platform with the pump to provide the necessary electrolyte flow for the spouted bed chamber. It is advantageous to incorporate a liquid by-pass circuit and adjustment valve so that the liquid flow to the spouted bed chamber can be adjusted. It is also desirable for the spouted bed vessel to be easily detachable from the portable apparatus and also for the internal components to be easily detachable from the vessel to facilitate parts unloading.

In a further modification of the invention, each process tank may be equipped with a corresponding pump and control valve having a coupling or docking station to which the spouted bed vessel is easily attached and detached so that a spouted bed vessel without its own pump and valve may be conveyed between process tank docking stations.

In the practice of the present invention, conductive parts are electroplated while being circulated in a liquid spouted bed, in which the liquid is an electrolyte containing metal ions. The parts form a moving packed bed which is maintained under cathodic current by being in contact with a current feeder. The passage of current through the parts causes metal to be deposited from the electrolyte onto the parts as they circulate in the apparatus. Typically, the parts are retained in a non-conductive cylindrical vessel with a conical bottom section, although vessels with other geometries may also be used. The vessel may be made of a clear plastic material.

The electrolyte is introduced into the vessel as a high velocity jet at the bottom of a conical section into the bed of parts to be plated. The liquid jet entrains parts which disengage from the liquid flow in a region above the moving bed and then move radially inward and downward as a moving packed bed of parts. The action provided by the liquid jet thus circulates the parts through the vessel; first upwards and radially outward in the jet and then downward and radially inward in the packed bed. The cathodic connection is made with the packed bed via metallic contacts or a current feeder attached to the inside of the conical section. If the surfaces of the parts to be plated are entirely conductive, the current feeder may be small in size with respect to the particle bed. If the parts are partially conductive by having non-conductive elements, as is the case with surface mounted electronic components, it is desirable to employ much larger surface area current feeders to insure electrical contact with the conductive elements of each of the parts in the moving bed. For example, the entire surface of the bottom conical section may be lined with a conductive material and used as a current feeder. The counterelectrode (anode) is suspended above the moving packed bed.

It is preferable to incorporate a "draft pipe" into the vessel to assist in the hydraulic transport of the parts. The draft pipe consists of a tube which is fixed coincident with the location of the spout, directly above and aligned with the liquid jet. The draft pipe delays dispersion of the liquid jet and allows part transport over a broader range of liquid velocities.

Additionally, it is preferable to employ a parts deflector located above the draft pipe. The parts deflector is a conical point or flat disk which is located above the spout. The deflector prevents the parts in the spout from exiting the chamber and directs the part trajectories toward the sidewall of the vessel. It also prevents the jet of entrained parts from colliding with any overhead components in the chamber. The parts deflector is particularly advantageous in conjunction with the draft pipe, since the presence of the draft pipe strengthens the flow of the spout.

It is also preferred to employ a distribution shield. The distribution shield may be conical and extends from the vicinity of the upper edge of the draft pipe to above the outer edge of the inclined bottom wall of the vessel. This shield aids in distributing the parts to the outer edge of the spouted bed by preventing parts from falling near the center of the reaction chamber. Instead, these parts move along the top surface of the shield until they are deposited at the outside edge of the moving bed of parts. When a distribution shield is employed, the anode is preferably located below the shield, directly above the moving packed bed of parts.

The present invention may also be practiced using rectangular vessels with slanted bottoms. In this case, the distribution shield would be an angled flat plate or plates, and the draft pipe and inlet pipe may be either tubular or rectangular.

The liquid electrolyte is injected into the reaction chamber via a centrifugal pump and, during operation, this arrangement presents no difficulties. However, when operation of the device is interrupted, the parts from the bed may fall into the outlet of the pump via gravity, effectively fouling the pump. Therefore, a means of retaining the parts in the vessel is provided. One approach is to incorporate a screen at the jet inlet which will not allow the parts to pass. If a screen is used, it is preferable to filter the fluid upstream of the screen to prevent fouling. An alternate approach is to utilize a solid "trap" arrangement. This can be a simple "U" pipe on the inlet line, or can consist of two concentric pipes which cause the liquid to reverse direction. In either case, the parts are trapped due to their density difference with respect to water. An access port can be incorporated into the trap to allow the parts to be conveniently removed from the spouted bed chamber.

The present invention also contemplates that the spouted bed vessel may be used in a stationary configuration in which the various cleaning, plating and rinse solutions are sequentially introduced from separate holding tanks, circulated through the reaction chamber for the appropriate time, and then purged from the spouted bed vessel via a manifold piping system connected to solution reservoirs, control valves, control system and pumps.

BRIEF DESCRIPTION OF THE DRAWINGS

The invention and its assembly and operation may be further understood from the following description of the preferred practices thereof, which are shown by way of example in the accompanying drawings wherein.

DETAILED DESCRIPTION OF PREFERRED EMBODIMENTS

Figure 1:
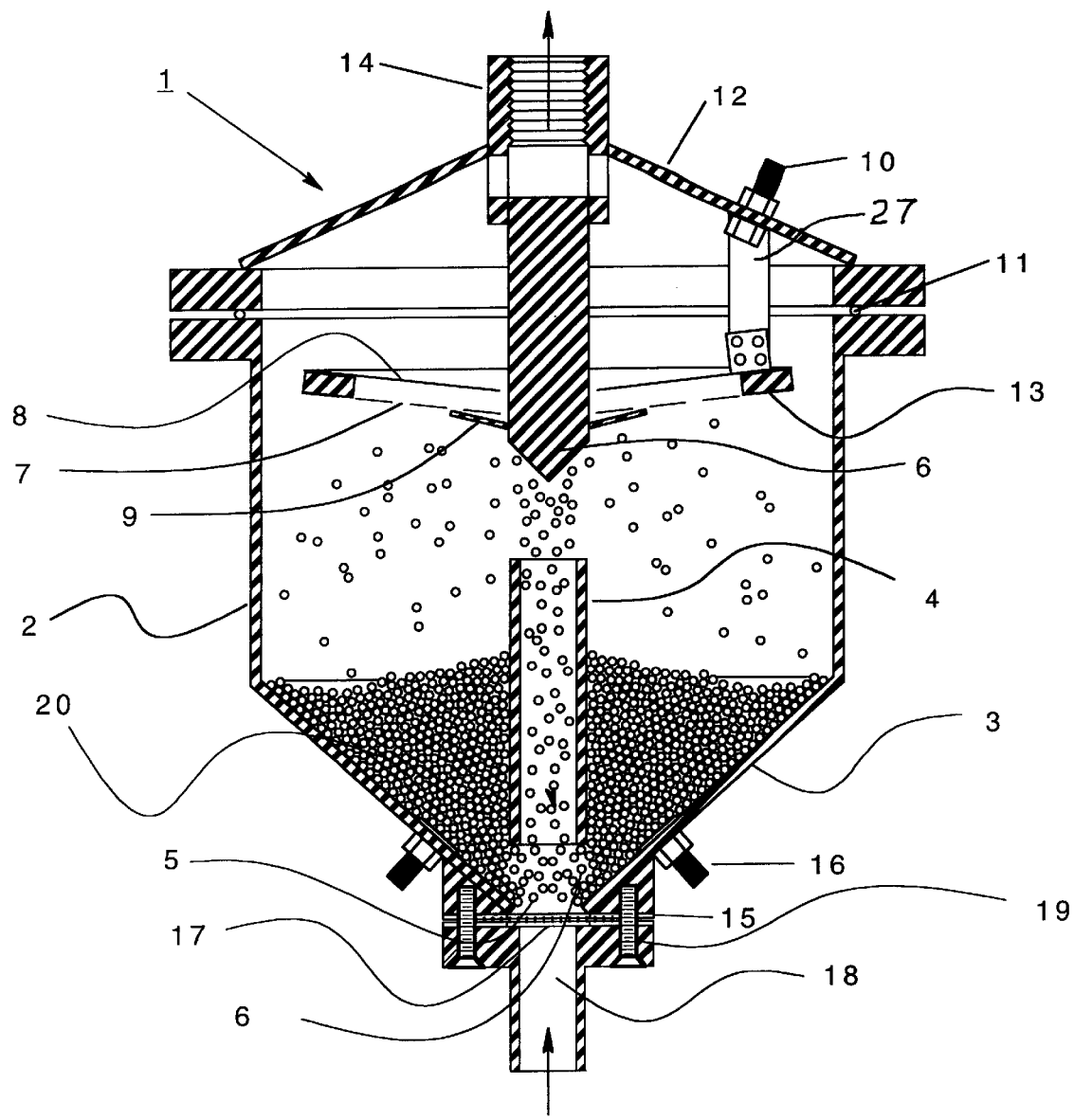
FIG. 1 is a cross-sectional elevational view of a spouted bed electrochemical reactor made in accordance with the present invention.

Turning now in greater detail to the appended drawings, FIG. 1 shows a cross-sectional view of an electrochemical reactor 1 having a vessel 2 defining a spouted bed chamber containing a draft pipe 4, an object deflector 6 with a deflector surface in the shape of an inverted cone, and an elastomer deflector skirt 9. The vessel 2 is cylindrical with a conical bottom 3 and a conical top 12 and is made of a non-conductive material such as plastic. Liquid electrolyte is injected into the chamber via a vessel inlet above an inlet flange 18 and a mesh screen 17. The mesh screen is sealed via elastomer gaskets 15 on each side thereof, and the inlet flange 18 is attached to the spouted bed vessel 2 by bolts 19. The screen 17 retains the recirculated parts or other objects 5 in the chamber when the liquid flow through the chamber is discontinued. Liquid enters the chamber via the inlet flange and forms a jet like stream which entrains objects 5 as they are fed through a gap 6 below the draft pipe 4.

The liquid stream with entrained objects moves through the draft pipe 4 and impinges on the object deflector 6. The object deflector directs the entrained objects 5 to the outer edge of the chamber 2 where they move downward and radially inward in a moving packed bed 20 towards the inlet pipe 18 and gap 6. Electrical contact with the bed 20 is made by electrodes in the form of flat head bolts 16 which penetrate the vessel bottom wall 3 and contact the moving objects which in turn are in contact with each other. A counterelectrode 8 is located above the deflector 6 and the deflector skirt 9 where it is protected against collision with the entrained objects by a plastic mesh 7 attached to a support frame 13. Electrical contact with counterelectrode 8 is via a conductor strip 27 and a bolt 10 which penetrates the chamber cover 12. Liquid exits the spouted bed chamber via an outlet in the form of a pipe fitting 14 attached to the conical cover 12. The conical cover is sealed by an elastomer O-ring 11.

In the embodiments shown in the drawings for coating objects with a metal constituent of the electrolyte, the electrodes in contact with the moving bed are connected to the negative terminal of a power source and function as cathodes, and the counterelectrode mounted in spaced relation above the moving bed is connected to the positive terminal of the power source and functions as an anode. The anode may be composed of stainless steel, platinized niobium, ruthenium or irridium oxide coated titanium, or another suitable material.

Figure 2:
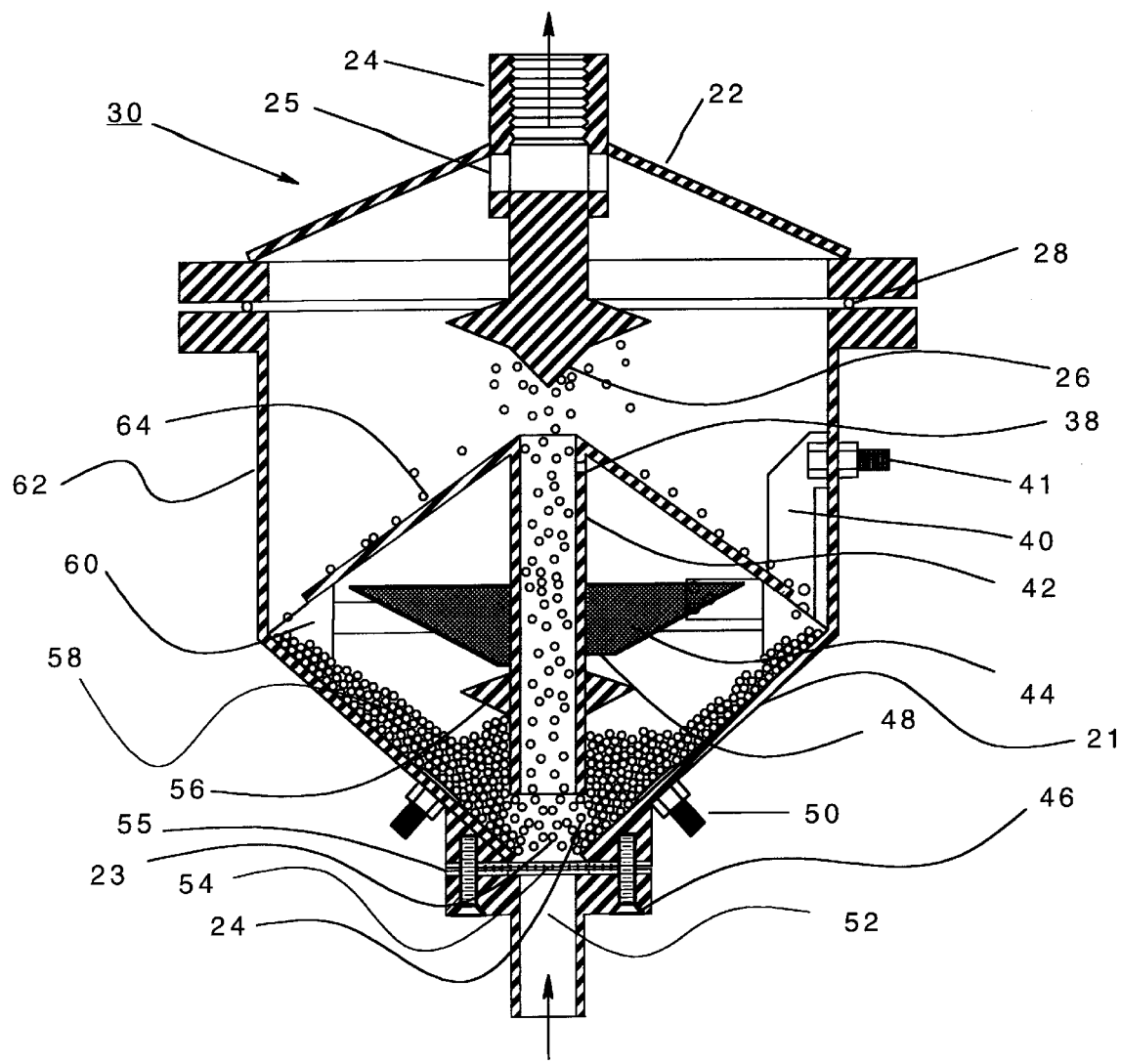
FIG. 2 is a cross-sectional elevational view showing a modified electrochemical reactor having a distribution shield.

FIG. 2. shows a spouted bed electrochemical reactor 30 wherein a vessel 62 contains a draft pipe 42, an object deflector 26 and an object distribution shield 64. The chamber 62 is cylindrical with a conical bottom 21 and a conical top 22. The liquid electrolyte is injected into the chamber of vessel 62 through an inlet flange 52 and mesh screen 54. The inlet flange is sealed to the chamber by screws 46 and elastomer gaskets 55. The screen 54 retains the objects in the chamber when the liquid flow through the chamber is discontinued. Liquid enters the chamber via the inlet flange 52 and forms a jet stream which entrains objects 23 as they are fed through a gap 24 below the draft pipe 42. The liquid stream, with entrained objects, moves through the draft pipe and impinges on the object deflector 26. The deflector directs the entrained objects outward. The deflected objects land on the distribution shield 64 and move radially outward until they are deposited onto the outer edge of the inclined bottom wall 21, where they move downward and radially inward towards the inlet flange 52 and gap 24 in a moving packed bed 58. The distribution shield 64 is attached to the vessel 62 via supports 60 that rest on the bottom wall 21.

Electrical contact with the bed 58 is made by flat head bolts 50 which penetrate the vessel bottom wall 21 and contact the moving bed of parts 58. The counterelectrode 44 is located under the distribution shield 64 and is connected to an external power supply (not shown) via a connector strip 40 and a bolt 41, which penetrates the sidewall of the vessel 62. A small hole 38 in the top of the draft pipe 42 vents anode gases from under the distribution shield 64 to the liquid stream in the draft pipe 42. A hole 48 in the counter electrode 44 directly below the vent hole 38 prevents stray objects that fall through the vent hole 38 from accumulating on the counterelectrode.

A deflector ring 56 mounted around the draft pipe 42 prevents objects moved by stray currents from the liquid jet from impinging against the counterelectrode 44, and also deflects outwardly any objects falling through vent hole 48 in the counterelectrode. Liquid exits the spouted bed chamber via a threaded pipe fitting 24 having inlet apertures 25 and attached to the cover 22. An O-ring 28 seals cover 22 to the spouted bed vessel 62 when the lip on the cover is clamped to the lip around the vessel opening by bolts (not shown). Cover 22 is preferably conical to facilitate the complete removal of gases evolved during electrolysis.

Figure 3:
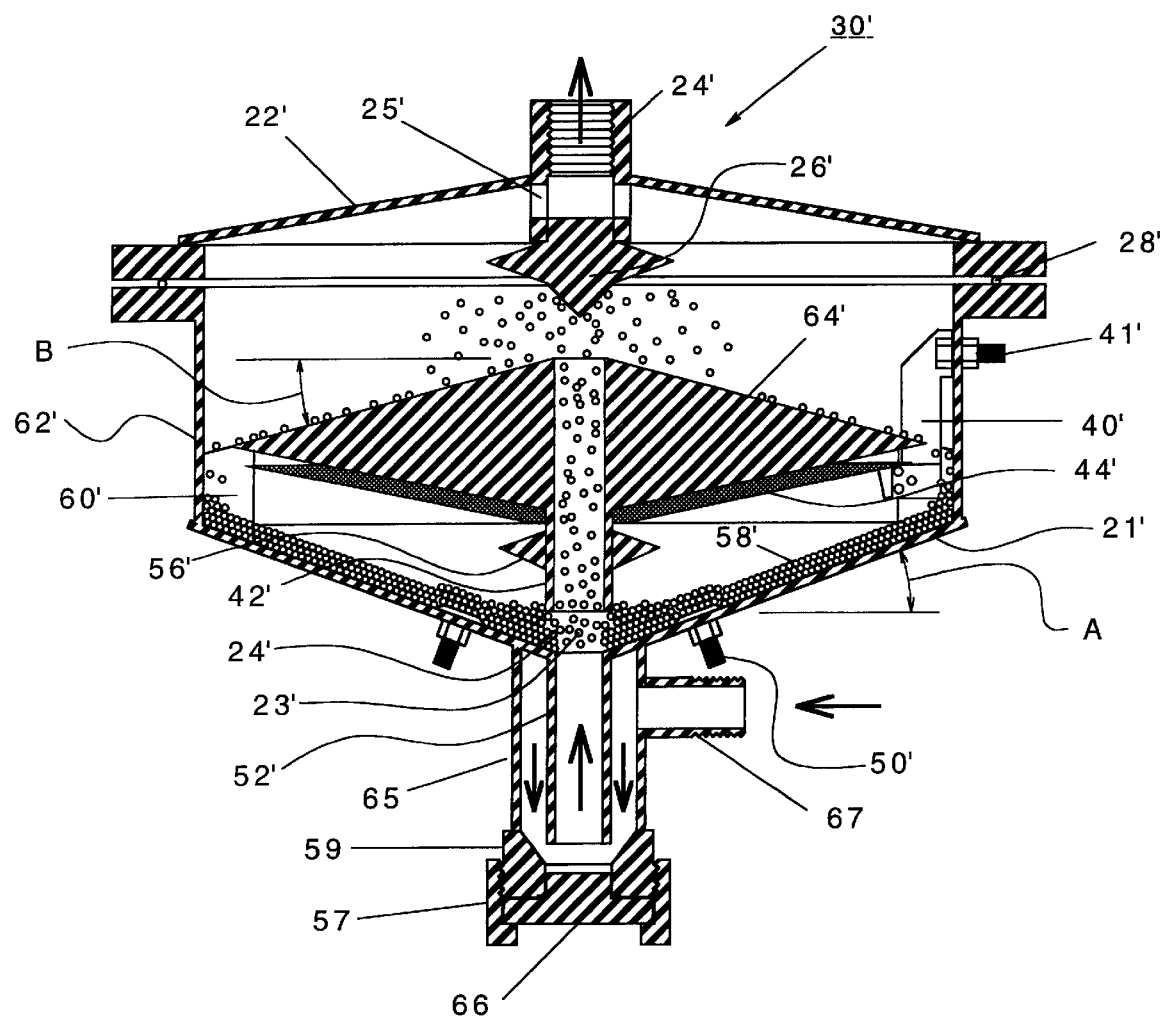
FIG. 3 is a cross-sectional elevational view of a modified electrochemical reactor having a shallow conical bottom and a concentric annular parts trap with a removal port.

FIG. 3 shows a spouted bed electrochemical reactor 30' with a vessel 62' containing a draft pipe 42', object deflector 26' and distribution shield 64'. The vessel 62' is cylindrical with a conical bottom 21' and a conical top 22'. The liquid electrolyte is injected into a chamber of the vessel through an objects trap consisting of an inner inlet pipe 52' and a concentric outer pipe 65. The outer pipe 65 has a threaded access port 59. The access port 59 is sealed by a cap 66 held in place by a threaded clamping ring 57. Liquid enters the annulus formed by concentric pipes 65 and 52' via a threaded pipe 67. Parts 52', 65, 59, 57, 66 and 67 form the objects trap, which retains the objects of the conductive bed 58' in the chamber when the liquid flow through the chamber is discontinued. The trap may also be used to discharge the coated objects from the chamber by removing cap 66 from the access port 59. Liquid enters the chamber via the inlet pipe 52' and forms a jet stream which entrains objects 23' as they are fed through a gap 24' below the draft pipe 42'.

The liquid jet, with entrained objects, moves through the draft pipe and impinges on the deflector 26'. The deflector 26' directs the entrained objects outward. The deflected objects fall onto the distribution shield 64' and move radially outward until they are deposited at the outer edge of the bottom wall 21', where they move downward and radially inward towards the inlet pipe 52' and gap 24' in a moving packed bed 58'. The distribution shield 64' is mounted in the chamber via a support 60' resting on the chamber bottom wall 21'. The angle A from the horizontal to the bottom wall 21', and the angle B from the horizontal to the upper surface of the distribution shield 64', are preferably in the range of 10°–70°, more preferably in the range of 20°–60°, and most preferably 20°–50° degrees for round objects and 35°–60° for non-round objects.

Electrical contact with the bed 58' is made by flat head bolts 50' which penetrate the chamber bottom wall 21' and contact the moving bed of objects 58'. The counterelectrode 44' is located under the particle distribution shield 64' and is connected to the external power supply (not shown) via a connector strip 40' and a bolt 41', which penetrates the sidewall of the vessel 62'. The bottom surface of the distribution shield 64' is sloped upwards and radially outward so that evolved gases easily exit the chamber without being trapped under the shield. A deflector ring 56' mounted around the draft pipe 42' prevents objects from impinging against the counterelectrode 44'. Liquid exits the spouted bed chamber via a threaded pipe fitting 24' having inlet apertures 25' and attached to the conical cover 22', which seals the spouted bed vessel 62' via an O-ring 28'. A conical cover facilitates the complete removal of gases evolved during electrolysis.

Figure 4:
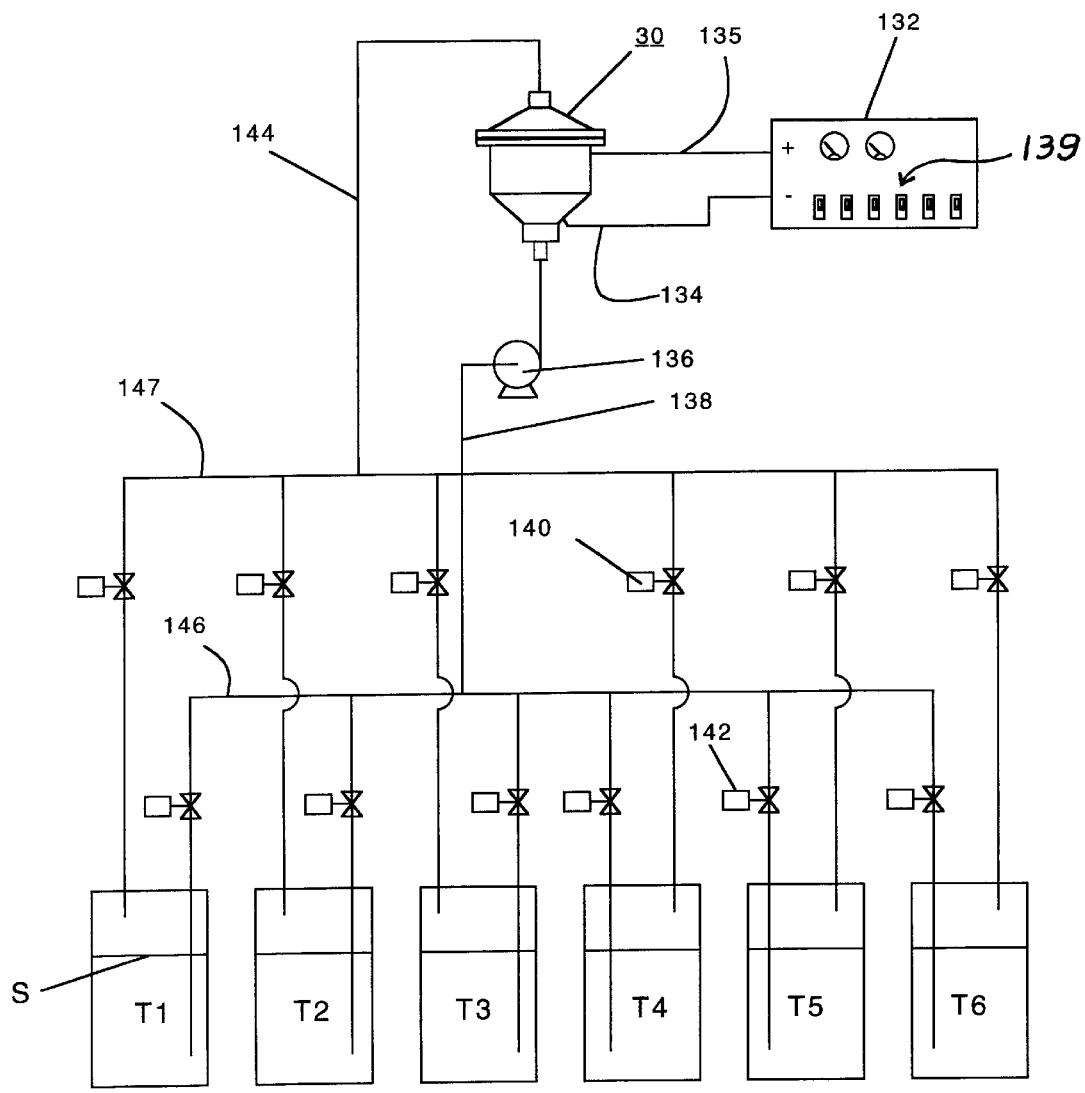
FIG. 4 is a diagrammatic illustration of a fluid system for providing multiple treatment solutions to the reactors of FIGS. 1–3.

FIG. 4 shows a schematic diagram of an electroplating fluid system which incorporates the stationary spouted bed electrochemical reactor 30 of FIG. 2 (or the corresponding reactor of FIGS. 1 or 3). Reactor 30 is connected via electrical cables 134 and 135 to a stationary power supply and control panel 132. Solutions for the electroplating process may include cleaners, acids, plating solutions and rinses contained respectively, in tanks T1–T6. The objects to be plated are loaded into the spouted bed vessel 30. Then, solutions from tanks T1–T6 are delivered separately to the spouted bed reactor 30 via inlet line 138, solenoid valves 142, inlet manifold 146 and pump 136. Solution exits the spouted bed reactor 30 via outlet line 144, outlet manifold 147 and solenoid valves 140.

During the electroplating process, the inlet and outlet solenoid valves to one process tank will be opened and the pump actuated to circulate the solution to and from the process tank in a closed loop. Each tank will be circulated in turn so that an electroplating process may be accomplished. The solenoid valves 140 and 142, power supply and control panel 132, and pump 136 may be actuated manually by switches 139 or may be computer controlled. At the end of the plating process, the plated objects are removed from vessel 30 and the process is repeated. Since only one inlet and outlet set of solenoid valves connected to process tanks T1–T6 will be open at any time, remotely actuated, multiport rotary selector valves may be substituted for separate solenoid valves 140 and 142.

Figure 5:
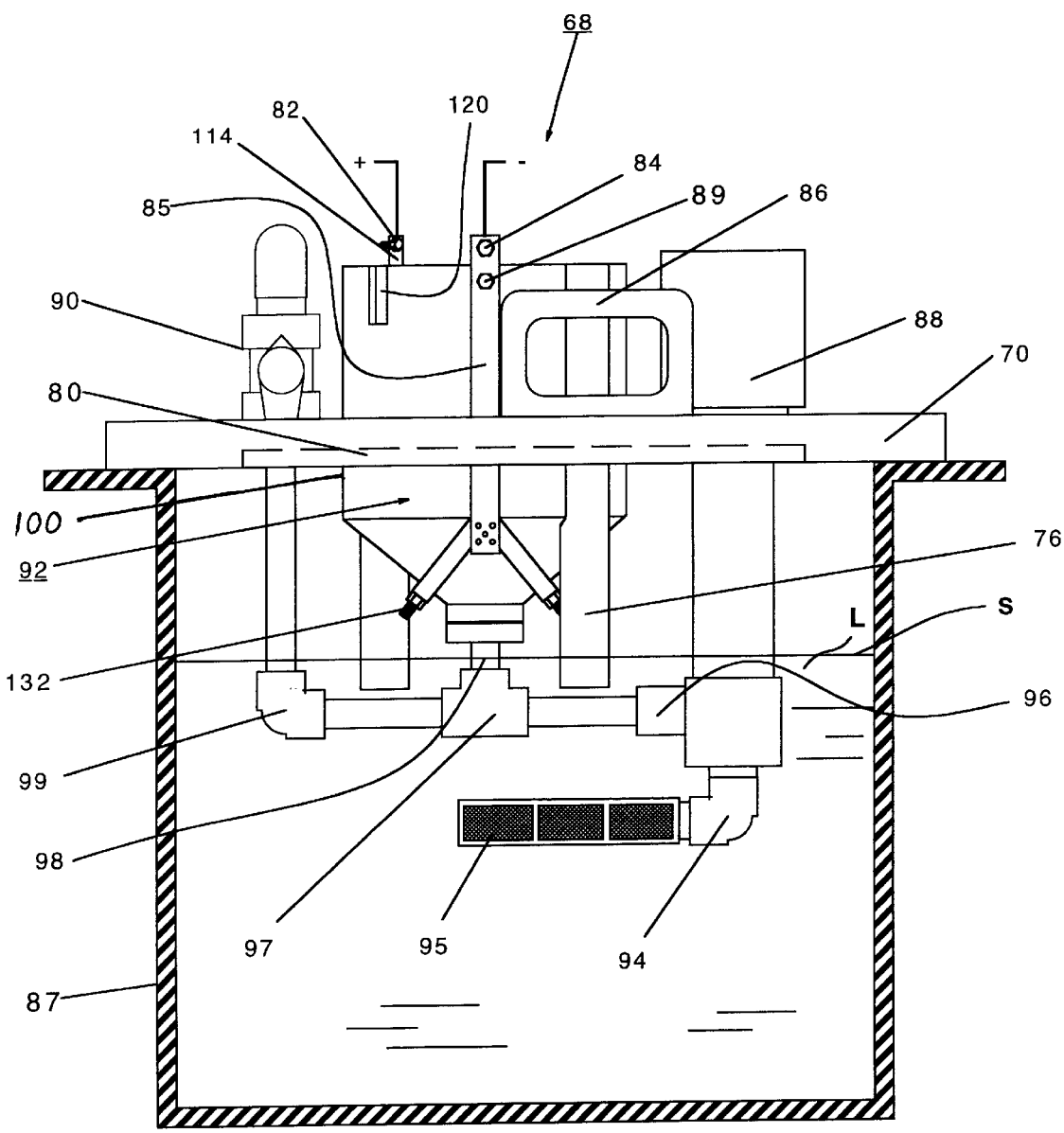
FIG. 5 is an exterior elevational view of a spouted bed plating apparatus in accordance with the invention as modified to provide a portable unit.
Figure 6:
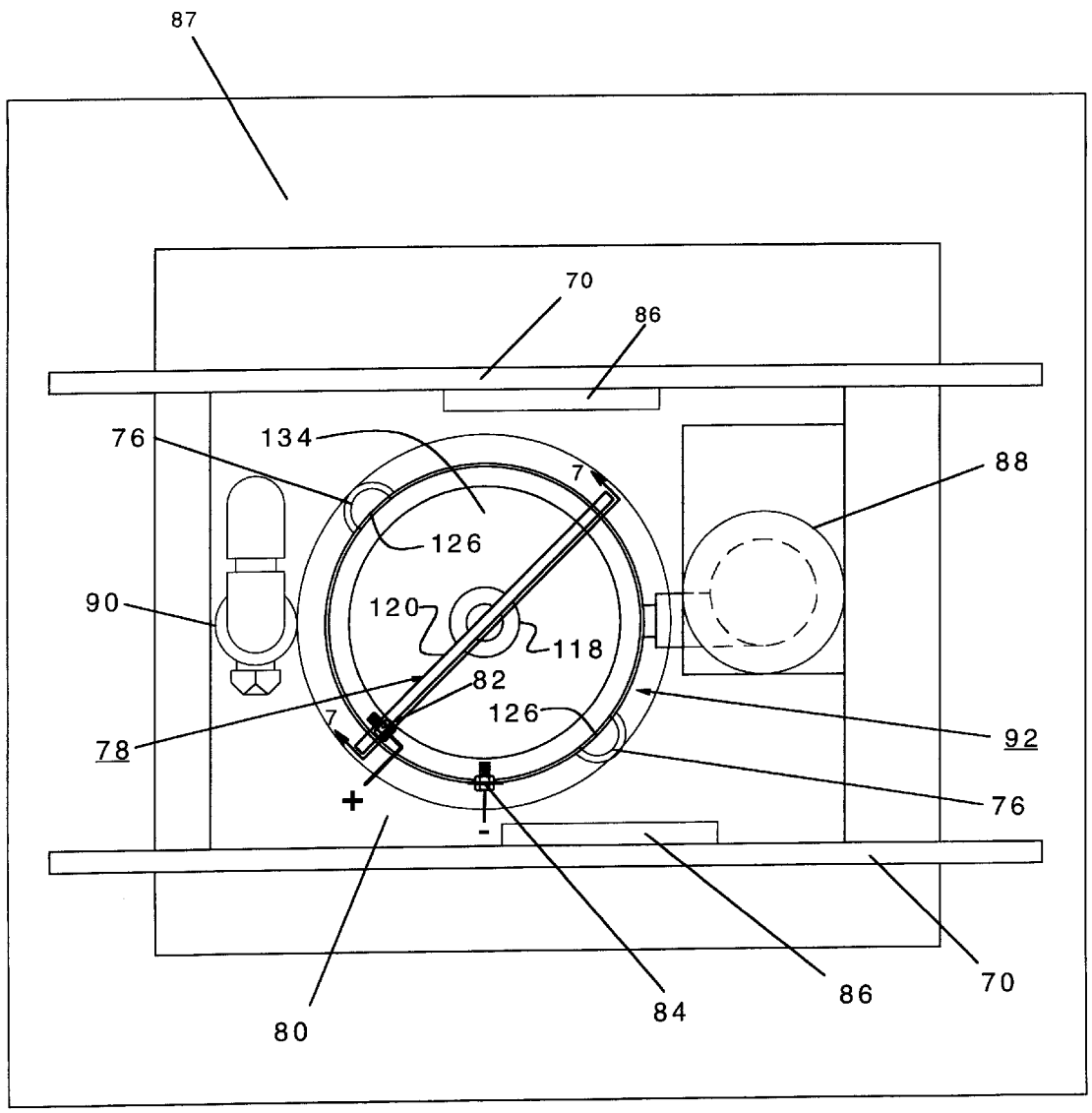
FIG. 6 is an exterior top view of the modified apparatus of FIG. 5.

FIGS. 5 and 6 show side and top views of a portable plating apparatus 68 having a spouted bed vessel 92 removably situated in a process tank 87 containing a process solution. This apparatus may be used in an analogous manner to a plating barrel or plating rack in that it is designed to be conveyed from tank to tank for circulating through the vessel 92 successive processing solutions, such as cleaning, rinsing, and plating solutions. Only the lower portion of the apparatus is immersed below the surface S of the process solution, the entire apparatus being supported by side rails 70 resting on the sidewall lip of each process tank 87. The apparatus includes a plastic platform 80 equipped with handles 86. A submersible head centrifugal pump 88 is mounted on the platform 80. The inlet of the pump is attached via an elbow 94 to a liquid strainer 95. The outlet 96 of the pump is connected via a short segment of plastic pipe to a plastic T fitting 97.

The inlet flange 98 of the spouted bed vessel 92 is detachably coupled to the T fitting 97. The third opening of the T fitting is attached via plastic pipe and elbow 99 to a plastic bypass ball valve 90. The outlet of the ball valve 90 returns solution to the process tank via similar segments of plastic pipe and elbows (not shown). The amount of solution circulated through the spouted bed vessel 92 can be adjusted by using the bypass valve 90. The spouted bed vessel 92 is open to the atmosphere and has overflow weirs 126. Solution is returned to the process tank 87 via channels 76 mounted on the side of the vessel 92 and extending to or below the liquid surface S in the process tank. The electrical connection to the cathode is made via a bolt 84 on a connector strip 85 secured to the vessel sidewall 100 by bolt 89. The anodic connection is made via a bolt 82 carried by a metallic strip 114, which is part of a removable spout and shield assembly generally designated 78.

Figure 7:
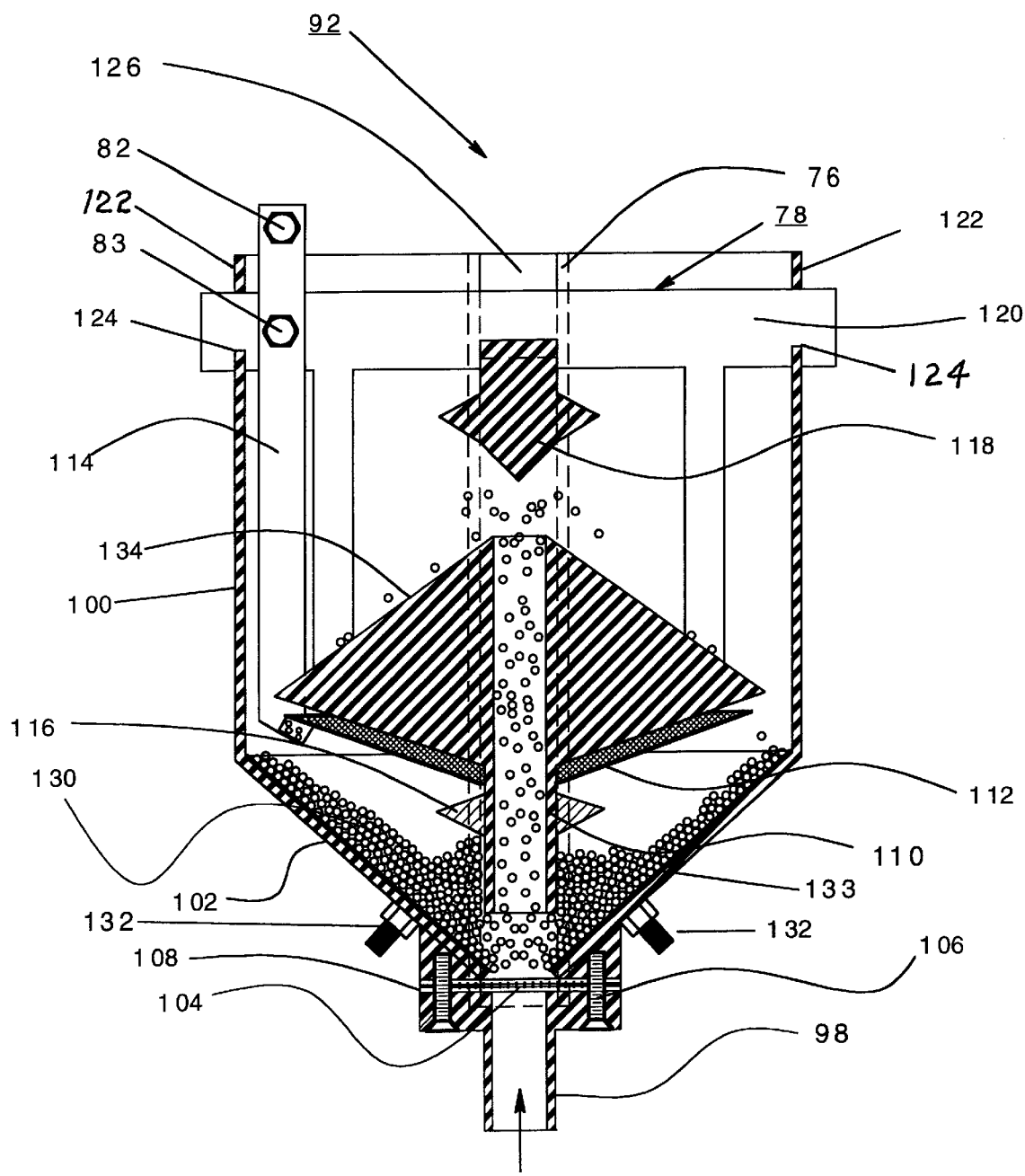
FIG. 7 is a detailed cross-sectional view of the reactor vessel of the portable spouted bed plating apparatus as taken along line 7—7 of FIG. 6.

FIG. 7 shows a detailed cross-sectional view of the spouted bed reactor vessel 92 of FIGS. 5 and 6. The vessel sidewall 100 is cylindrical with a conical bottom wall 102. The distribution shield 134 has an upwardly sloped bottom surface which prevents gases generated at the counterelectrode 112 and in the moving bed electrode 130 from accumulating under the shield. The electrolyte is introduced into the chamber of the vessel 92 via the inlet flange 98 and through the inlet screen 104. The inlet flange 98 is attached to the chamber via screws 106 and the inlet screen 104 is pressed between the bottom of the vessel and the inlet flange 98 and sealed via elastomer gaskets 108 on each side of the screen. The draft pipe 110, anode 112, anode connector strip 114, deflector ring 116, object deflector 118, distribution shield 134, distribution shield support 120 and bolts 82 and 83 form the removable assembly 78, which slides into two notches 122 in the lip of the vessel sidewall 100 at positions radially opposite to each other. The distribution shield support 120 also has two notches 124, one near each end, which interlock with the notches 122 in the vessel sidewall 100. The resulting assembly is easily removed to facilitate unloading the treated objects.

Electrical connection is made with the moving bed of objects 130 by a current feeder 133 in the form of a conical stainless steel sheet lining the bottom conical wall 102. Current feeder 133 is connected to the external power supply (not shown) via bolts 132 penetrating the bottom conical wall 102 and connected to the external metallic strip 85. The external power supply is preferably connected to the bolts 82 and 85 via cables equipped with spring loaded clamp connectors (not shown).

The hydrodynamic and electrical functions of the spouted bed chamber are the same as that described for FIG. 2, with the exception that the top of the chamber is open and electrolyte exits the chamber by overflowing into two weir slots 126 and flowing down the two solution channels 76 attached to the outside of the chamber, and that the current feeder 133 extends over a substantial portion of the conical surface of the chamber bottom wall 102. To facilitate unloading the electroplated objects, the vessel 92 is readily removable from the rest of the apparatus 68 by detaching the flange 98 from the T-fitting 97, and the assembly 78 is readily removable from the vessel 92 by sliding the cross support 120 upwardly out of the slots 122.

Figure 8:
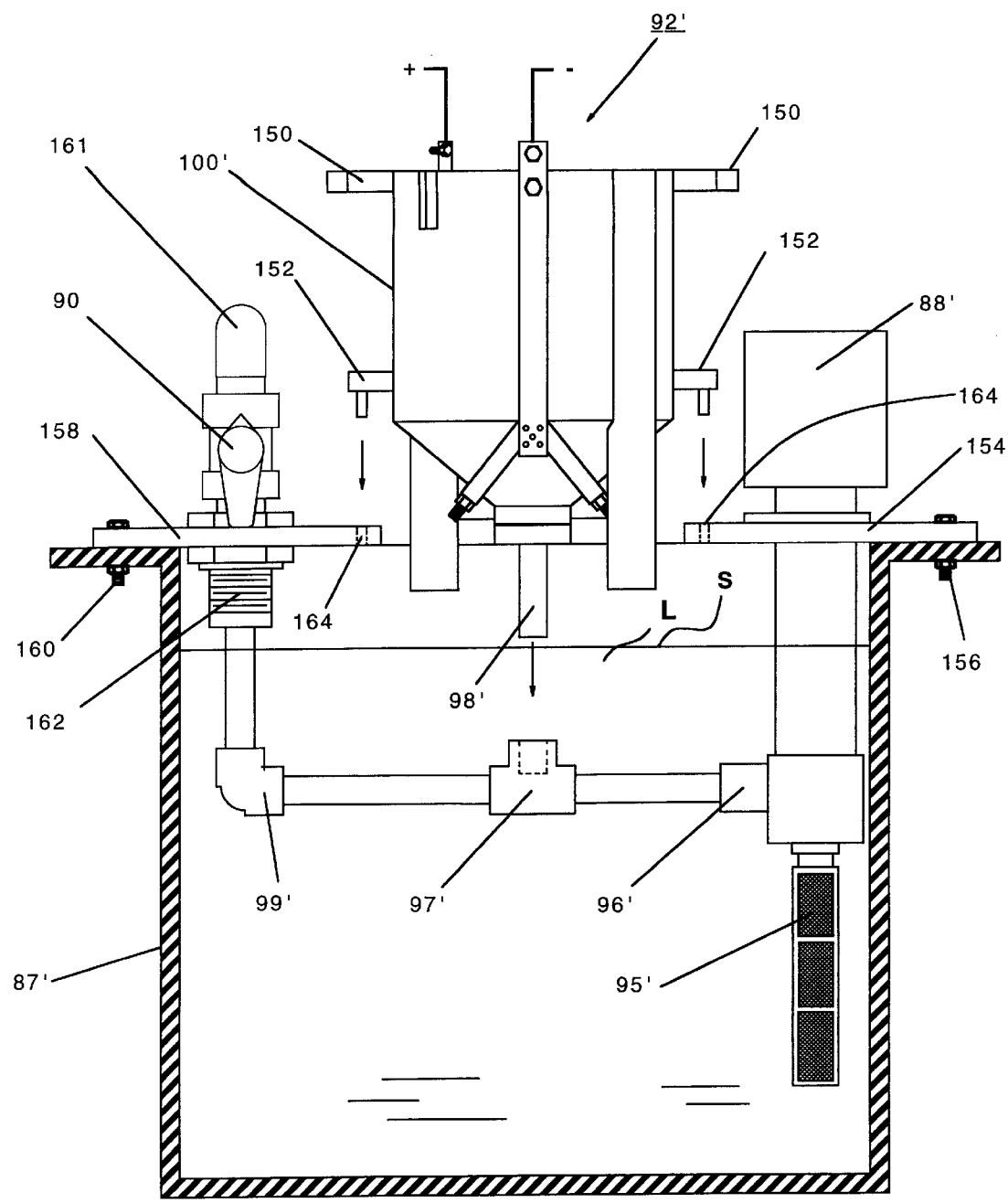
FIG. 8 is a cross-sectional elevational view of a modified spouted bed electrochemical apparatus with a portable reactor vessel and stationary docking system.

FIG. 8 shows an exterior elevational view of a spouted bed plating system that utilizes a stationary docking assembly and a portable spouted bed reactor vessel 92', which is conveyed between multiple process tanks each equipped with the same stationary docking assembly. The docking assembly is comprised of a submersible head pump 88', which is attached to the sidewall lip of tank 87' via a platform 154 and bolt 156. The inlet of pump 88' is connected to a strainer 95' and the outlet 96' of pump 88' is connected via a segment of plastic pipe to a T fitting 97'. A second short segment of pipe extends from T fitting 97' to an elbow 99'. Another segment of pipe extends from elbow 99' to a bulk head fitting 162 mounted on a second platform 158, which is attached to the tank sidewall lip by a bolt 160. The platforms 154 and 160 may be segments of a unitary platform extending around the sidewall lip of the tank 87'. Ball valve 90 mounts to bulkhead fitting 162 and controls the amount of solution bypassing the spouted bed chamber. An elbow 161 is connected to the outlet of valve 90, and is also connected via a short segment of pipe to a second elbow and segment of pipe (not shown), which extend down to the solution surface S to return the bypassed solution to tank 87'. The spouted bed plating vessel 92' is identical to vessel 92 depicted in FIG. 7, with the exceptions of the attaching pin brackets 152 and the handles 150 mounted on the vessel sidewall 100'. The attaching pins on brackets 152 mate to corresponding holes 164 in platforms 154 and 158 when the inlet flange 98' is inserted in T fitting 97'.

EXAMPLES OF ELECTROPLATING

Example 1

A portable plating apparatus with a 7.5" diameter spouted bed chamber having a draft pipe and particle distribution shield was used to electroplate 2 mm long, 0.7 mm diameter, stamped copper connector clips. These clips cannot be easily electroplated in a barrel since they are very light and tend to interlock when tumbled with media. 50 ml of clips, comprising approximately 20,000 pieces, were loaded in the spouted bed chamber. This is the minimum load for this size apparatus. The apparatus was conveyed by hand between process tanks and was subjected to the following treatment sequence:

| | | |
|---|---|---|
| 1. Soak cleaner | 5 min | |
| 2. Cathodic electrocleaner | 5 min | 6 V, 6 A |
| 3. Water rinse | 3 min | |
| 4. HCl (50%) Activator | 5 min | |
| 5. Water rinse | 5 min | |
| 6. Cyanide dip | 3 min | |
| 7. Copper cyanide plating | 5 min | 6 V, 8 A |
| 8. Dragout rinse | 1 min | |
| 9. Water rinse | 3 min | |
| 10. Sulfuric acid (5%) | 5 min | |
| 11. Water rinse | 3 min | |
| 12. Sulfamate nickel plating | 20 min | 6 V, 8 A |
| 13. Water rinse | 3 min | |

-continued

| | | |
|---|---|---|
| 14. Sulfuric acid (5%) | 5 min | |
| 15. Water rinse | 3 min | |
| 16. Hard Gold Plating | 25 min | 6 V, 6 A |
| 17. Dragout rinse | 3 min | |
| 18. Water rinse | 3 min | |
| 19. Hot DI water rinse | 3 min | |

A sampling of 10 clips was tested for nickel and gold deposit thickness by x-ray diffraction analysis. An average thickness of 124.9 micro inches of nickel was measured with a standard deviation of 18.0 micro inches. An average thickness of 32.7 micro inches of gold was measured with a standard deviation of 2.1 micro inches. No interlocking of the clips was observed.

Example 2

3 mm diameter flat sensor disks were electroplated using a portable plating apparatus with a 7.5" diameter spouted bed chamber equipped with a draft pipe and particle distribution shield. Disks were also electroplated in a conventional barrel plating apparatus as a means of comparison. The plating sequence given below was used for both trials:

| | | |
|---|---|---|
| 1. Soak cleaner | 5 min | |
| 2. Cathodic electrocleaner | 5 min | 6 V, 6 A |
| 3. Water rinse | 3 min | |
| 4. HCl (50%) Activator | 5 min | |
| 5. Water rinse | 5 min | |
| 6. Cyanide dip | 3 min | |
| 7. Copper cyanide plating | 5 min | 6 V, 8 A |
| 8. Dragout rinse | 1 min | |
| 9. Water rinse | 3 min | |
| 10. Sulfuric acid (5%) | 5 min | |
| 11. Water rinse | 3 min | |
| 12. Sulfamate nickel plating | 20 min | 6 V, 8 A |
| 13. Water rinse | 3 min | |
| 14. Sulfuric acid (5%) | 5 min | |
| 15. Water rinse | 3 min | |
| 16. Hard Gold Plating Spout, versus Barrel | 222 min, 382 min, | 6 V, 5 A 6 V, 15 A |
| 17. Dragout rinse | 3 min | |
| 18. Water rinse | 3 min | |
| 19. Hot DI water rinse | 3 min | |

The disks electroplated in the barrel required the addition of plating media (metal shot) to maintain proper cathodic contacting in the barrel. The volume ratio of media to plated parts was approximately 3 to 1. The parts and plating media were plated in the barrel using gold electrolyte at 6 V and 15 A for 6.36 hours to achieve an average thickness of 222.8 micro inches with a standard deviation of 12.0 micro inches.

The disks were plated in the spouted bed plating apparatus at 5 A, 6V for 3.7 hours to achieve an average thickness of 220.1 micro inches with a standard deviation of 7.4 micro inches. The spouted bed apparatus not only deposited metal 42% faster than the barrel, but since no media was required, all the gold deposited was on the product parts, not the media. Thus, approximately five times more gold was required to plate the parts in the barrel than to plate the parts in the spouted bed apparatus.

Examples of Electrowinning

The present invention is also suitable for electrowinning to recover metal values from process solutions, wastewaters, or mining leachants, and as a method of pollution prevention and wastewater treatment. Presently-employed technologies for treating metal-bearing aqueous waste streams, such as chemical precipitation and ion exchange, do not leave the metal in a form where it can be recycled economically. The need for toxic waste reduction and recycling of usable materials necessitates the development of technologies that will reduce the concentration of dissolved metal in waste streams and allow the recycling of the recovered metals.

The performance, cost, and maintenance requirements of conventional electrowinning systems make them economically attractive only for certain limited applications. The present invention is a significant improvement in this technology, as it will lower equipment cost, reduce maintenance requirements and improve performance, thereby making a much wider range of electrolytic recovery applications possible.

The operating goals for electrowinning are somewhat different than those for electroplating. In electroplating, the quality and uniformity of the deposit are of paramount concern, with the current efficiency being of secondary importance. In electrowinning, maximizing current efficiency and current density are the primary goals.

The present invention may be used for electrowinning by using conductive media as the spouted bed cathode. The media may consist of metal shot, cut wire shot, metallized glass spheres, or graphite or carbon spheres or granules. The use of spherical media is particularly advantageous since very shallow chamber bottom and distribution shield angles (angles A and B in FIG. 3) may be used while maintaining excellent bed movement. When metal shot or metallized glass spheres are used as the bed media, the metal is recovered in a valuable, easily recycled form.

In conventional electrowinning, flat electrodes (cathodes and anodes) are immersed in the solution to be treated. A potential is imposed between the electrodes and a direct current is passed through the solution. At the cathode, charged metal ions diffuse to the surface where they receive electrons from the cathode and are reduced to their metallic state. The metal can be present in the solution as a free metal cation or as a complex metal anion, for example, a cyanide complex. It should be noted that the primary mechanism transporting metal ions to the cathode is ordinary Fickian diffusion and is not electrical in nature.

At very low current densities, the rate of reduction at the cathode will be proportional to the current density (current per unit area of electrode). At higher current densities, however, the rate of metal reduction is limited by the rate of diffusion of the metal ions to the cathode surface. This puts a practical limit on the current density that can be effectively applied. The limiting current density can be calculated using Fick's first law for steady state diffusion, and invoking the Nernst assumption of a linear concentration variation in the diffusion layer. The equation for the diffusion-limited current density is:

$$i_L = -DnFC/d$$

Where:
$i_L$—Limiting current density
D—Diffusion coefficient of the metal ions
n—The charge of the metal ions
F—Faraday's number
C—Bulk liquid concentration of metal ions
d—Thickness of the Nernst diffusion layer The thickness of the Nernst metal ion depleted layer depends on the extent of agitation in the solution adjacent to the electrode. For a stationary solution, the thickness of the Nernst layer is about 0.05 cm. For an agitated solution, the thickness will be between 0.01 to 0.005 cm. The rate of diffusion of metal ions through the ion depleted layer will be linearly proportional to the concentration gradient in the layer. The metal concentration at the cathode surface can be assumed to be zero, so the concentration gradient will be the bulk metal ion concentration divided by the Nernst layer thickness. These two factors control what the limiting current density will be on a flat cathode.

As an example, the limiting current for recovery of silver from a 1000 ppm silver cyanide solution with moderate agitation is approximately 0.6 A/cm. The current efficiency, however, typically falls off at current densities approximately an order of magnitude less than this, because as the metal ion concentration at the cathode decreases, other electrode reactions begin to predominate. To maintain high current efficiencies, therefore, low current densities are required, which restricts the deposition rate.

In a cathode which is porous or consists of a packed bed of solid objects, the situation is quite different. The surface area is considerably larger than that of a geometrically equivalent flat electrode, and the current density will vary with the surface features of the cathode. The highest current density will be at the sharp points on the surface, while the lowest current density will be in the recesses. Additionally, the diffusion of ions will no longer take place through a layer of uniform thickness. The increased surface area decreases the current density, thereby increasing the current efficiency. Furthermore, if the average pore radius provided by the objects making up the electrode is smaller than the Nernst layer thickness, and the solution can be replenished in the pores, the diffusion path will be shortened to less than the pore radius, and even higher current efficiencies and current densities can be achieved.

Although the above analysis indicates the potential performance improvement that porous or packed bed cathodes offer, the ability of most electrolytes to chemically dissolve back the electrodeposited metal complicates the design of packed bed or porous cathodes. Most electrolytes are capable of back dissolution of the constituent metal. Some examples are cadmium cyanide solution, copper etchants, copper nitrate, copper sulfate, and nickel sulfate. The net metal recovered from these types of solutions is the difference between the electrodeposited metal and the metal dissolved back. The rate of back dissolution in acidic solutions, such as sulfates and nitrates, is a function of pH and can be minimized to some extent by pH control during electrolysis.

However, the extremely large surface areas of porous or packed bed cathodes in conjunction with strong liquid-solid contacting results in significant back dissolution of metals. This is further complicated by the fact that the vast majority of current transfer from the cathode to the electrolyte is concentrated at the electrode surface closest to the anode with the current being conducted within the packed bed cathode via object to object conduction. Thus, the current density within the cathode bed is very low. These factors result in a net loss of metal from the interior of the bed due to chemical dissolution. This phenomenon significantly impedes the deposition of metal using packed bed cathodes when the projected bed surface area to volume ratio is small, such as with the system used by Hadzismajlovic et al. mentioned above.

This problem can be ameliorated by using thin or shallow beds as in the FIG. 3 embodiment of the present invention where the projected area to volume ratios are high. The use of a distribution shield allows the spouted bed diameter to be increased without increasing the liquid flow rate. Furthermore, a conical bottom with a shallow slope may be used, which effectively increases the bed projected surface area without increasing the bed volume. When a spouted bed with a shallow bottom, a draft pipe and a distribution shield is used, the objects move radially inward towards the center of the bed, rather than downward as in a conventional spouted bed. The loading of the parts, particles or other objects can be maintained so that a layer one, two or three objects thick moves inward along the chamber bottom. The liquid-solid contacting is significantly less in this configuration than in conventional spouted beds, since the liquid flows over the moving bed electrode rather than through the bed, as is the case in conventional spouted beds such as the system disclosed by Scott as mentioned above. Additionally, when the bed is shallow, most of the objects receive current from the electrolyte, in contrast to deeper beds where only a small fraction of the objects at the surface of the bed receive current from the electrolyte. These two effects are particularly advantageous for electrolytic recovery of metals from solutions which can chemically dissolve the metal being recovered.

The following examples illustrate the use of the spouted bed cathode in electrowinning applications.

Example 3

Figure 9:
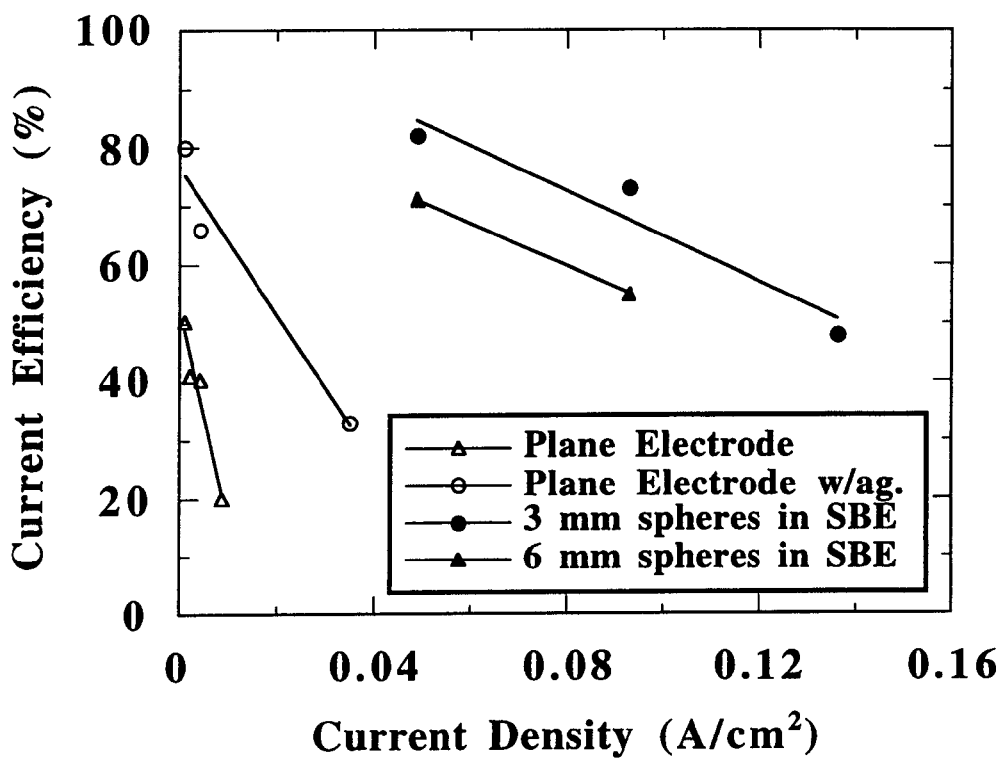
FIG. 9 is a graph showing current efficiency as a function of current density for the electrolytic recovery of silver from a cyanide solution in a spouted bed electrochemical reactor of the invention using 3 mm and 6 mm spheres as compared to using a plane electrode, with and without agitation.

FIG. 9 shows the current efficiency as a function of current density for a spouted bed cathode in a spouted bed reactor. The experiments were conducted using a silver cyanide solution containing 34.1 g $K(AgCN)_2$ and 42.5 g of KCN per gallon. As shown in this figure, the spouted bed cathode comprised either 3 mm diameter spheres or 6 mm diameter spheres, and produced considerably better performance at much higher current densities than a plane electrode without agitation, as well as a plane electrode in a mechanically agitated cell. This means that for the same amount of expended electrical energy, a much greater amount of metal can be removed at a much higher rate.

Figure 10:
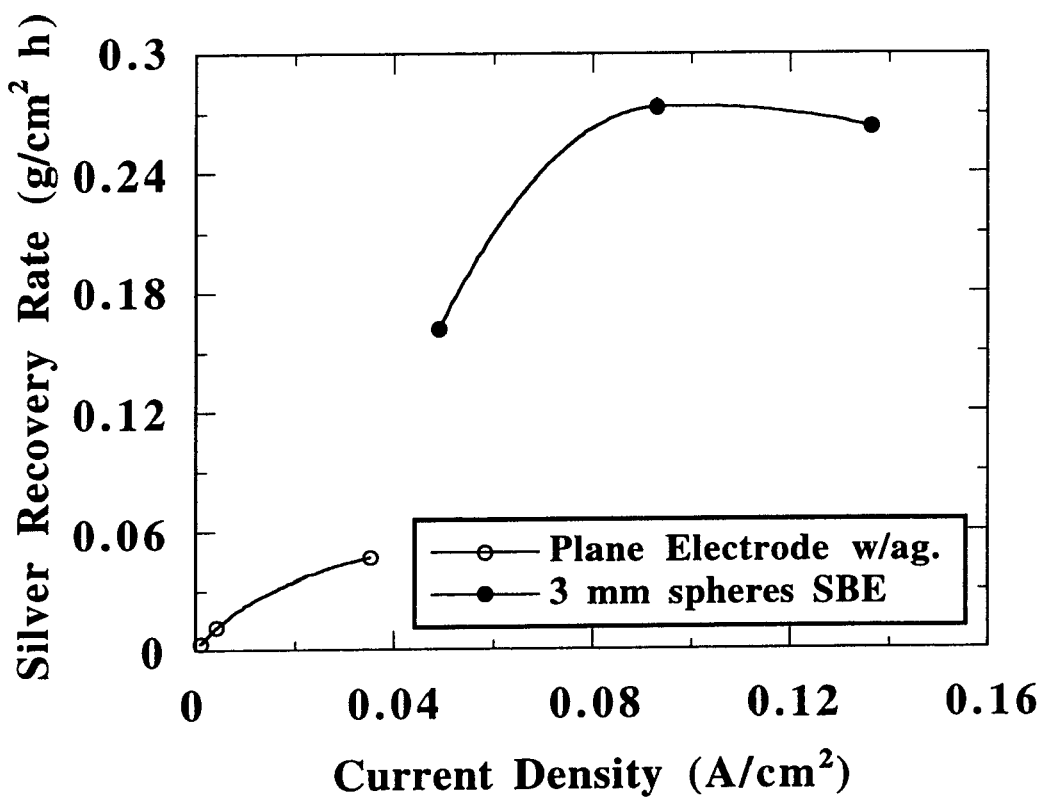
FIG. 10 is a graph showing the silver recovery rate from a cyanide solution as a function of current density in a spouted bed of the invention, as compared to using a plane electrode in an agitated solution.

In order to emphasize the considerable increase in recovery rate of the spouted bed cathode, the data in FIG. 9 are replotted in FIG. 10 as the rate of silver recovery from the silver cyanide solution per unit area of cathode material vs. the current density, in order to compare the 3 mm spheres in the spouted bed with the plane electrode exposed to the agitated solution. The rate of metal recovery is calculated by multiplying the current efficiency by the current density and the electrochemical equivalent for silver (4.024 g/A-hr). As shown, the spouted bed recovered metal as much as a factor of six times faster than the plane electrode.

Example 4

Figure 11:
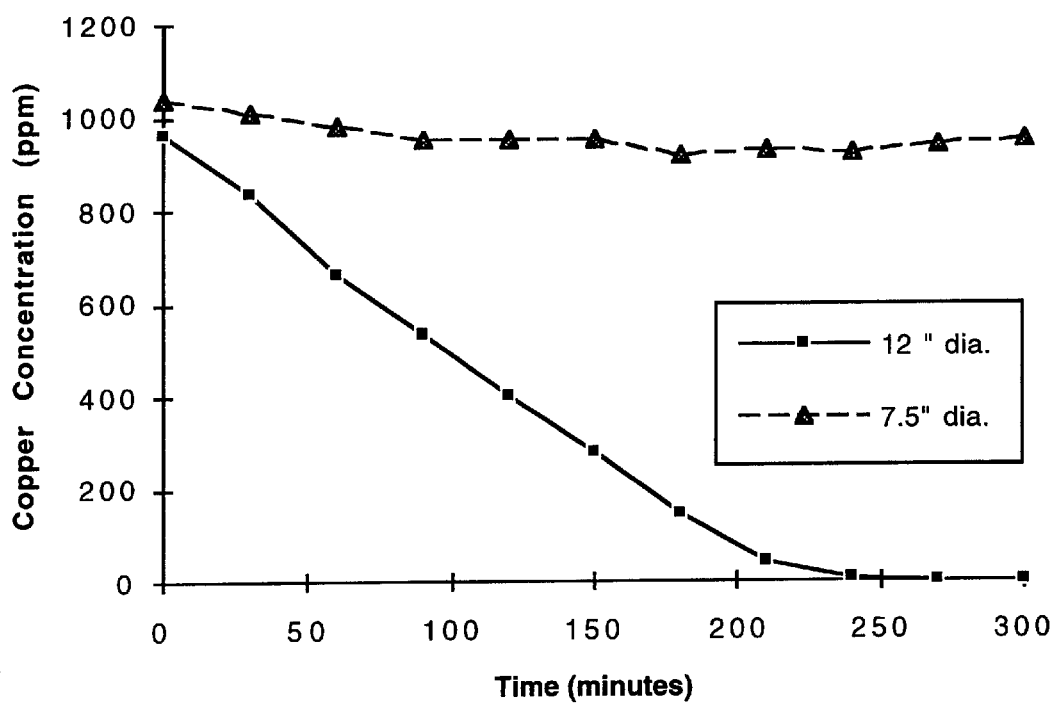
FIG. 11 is a graph showing the copper concentration as a function of time for recovery of the metal from copper sulfate solution at pH 1.9 using a shallow 12" diameter spouted bed reactor of the invention as compared to using a deeper 7.5" spouted bed reactor.

Copper was recovered from copper sulfate solution at pH 1.9 in a spouted bed reactor using a cathode comprising 500 ml of 2 mm diameter metallized glass spheres. One experiment was conducted at 7.5 amperes in a 7.5" diameter chamber equipped with a draft pipe and a particle deflector, but no distribution shield. The second experiment was conducted with a 12" diameter chamber equipped with a draft pipe, a particle deflector and a distribution shield. FIG. 11 shows that the 7.5" chamber resulted in almost no reduction in copper concentration while the 12" chamber rapidly recovered copper. This is due to the reduction in back etching when a shallow spouted bed with a distribution shield is used instead of a deeper spouted bed without the shield.

Persons skilled in the art, upon learning of the present disclosure, will recognize that various modifications to the components and elements of the invention are possible without significantly affecting their functions. For example, the specific vessel structure described above may be varied widely in accordance with spouted bed technology, and may have shapes other than cylindrical, such as four sidewalls defining a rectangular chamber and either a single rectangular bottom wall inclined downwardly to the vessel inlet or opposing rectangular bottom walls converging downwardly toward the vessel inlet. Similarly, the positions of the anode and cathode may be reversed so that metal objects may be polished by having an outer layer removed electrolytically. Furthermore, the apparatus disclosed may be used with a gaseous fluid into which a liquid spray of a chemical coating composition is injected below the draft tube in order to coat recirculating objects with the chemical composition instead of a metal, thereby providing a spouted bed coating apparatus of the type represented in general by that disclosed in U.S. Pat. No. 5,254,168 issued Oct. 19, 1993, to Littman, et al., the entire contents of this patent being incorporated herein by reference. Accordingly, while the preferred embodiments have been shown and described in detail by way of example, further modifications and embodiments are possible without departing from the scope of the invention as defined by the claims as set forth below.

What is claimed is:

1. An apparatus for contacting a plurality of objects with a fluid, said apparatus comprising:

a vessel having at least one bottom wall inclined downwardly from at least one sidewall toward a fluid inlet arranged to provide an upwardly directed stream of said fluid for causing said objects to flow upward from a feed position adjacent to said inlet to a disengaging position at which said objects are disengaged from said stream a distribution shield mounted in said vessel and having an upper surface inclined downwardly and extending away from the vicinity of said disengaging position to a return position such that said disengaged objects fall on the upper surface of said distribution shield and move downwardly thereon away from said disengaging position to said return positions, said return position being arranged above an upper portion of said inclined bottom wall to deposit said disengaged objects onto the upper portion of said inclined bottom wall, and said inclined bottom wall being arranged to cause a bed of said deposited objects to move downward along said inclined bottom wall from the upper portion toward said feed position; and a conduit mounted in said vessel and arranged above said fluid inlet for receiving said upward flow of objects, said conduit extending upwardly to confine the flow of said objects from the vicinity of said feed position to at least the vicinity of said distribution shield and being arranged to cause said upward flow of objects to pass through an opening in said distribution shield.

2. An apparatus according to claim 1, wherein said bottom wall has a conical shape and is substantially surrounded by said sidewall, and wherein an upper portion of said distribution shield is connected to an upper portion of said conduit.

3. An apparatus according to claim 1 for coating said objects with a metal, wherein said fluid is a liquid electrolyte comprising said metal and said objects are at least partially electrically conductive, and wherein said apparatus further comprises an electrode positioned to contact said moving bed and a counterelectrode arranged to contact said fluid.

4. An apparatus according to claim 3, wherein said electrode comprises a sheet of electrically conductive material covering a substantial portion of said bottom wall and arranged to contact said moving bed of objects.

5. An apparatus according to claim 3, wherein said counterelectrode is located under said distribution shield and includes means for preventing said objects from being retained on an upper surface of said counterelectrode.

6. An apparatus according to claim 5, wherein said counterelectrode is positioned above said distribution shield, an wherein said apparatus further comprises a deflecting member mounted below said counterelectrode so as to intercept objects carried upward by currents of said fluid and deflect them away from said counterelectrode.

7. An apparatus according to claim 3, wherein said distribution shield and said counterelectrode are detachably suspended in said vessel and are removable to permit the objects in said moving bed to be removed from said vessel.

8. An apparatus according to claim 1, wherein said vessel includes fluid outlet means for discharging said fluid from said vessel; and wherein said apparatus further comprises means for sequentially supplying to said vessel inlet a plurality of fluids each from a corresponding source, and means for returning each of said fluids from said vessel outlet means to said corresponding source from which the fluid was supplied.

9. An apparatus according to claim 8, wherein said sequential supply means comprises means for detachably mounting said vessel sequentially on each of a plurality of containers each of which constitutes the corresponding source of one of said fluids.

10. An apparatus according to claim 9, wherein said sequential supply means further comprises pump means for conveying to said vessel inlet fluid from the container on which said vessel is mounted, control valve means for controlling the flow of fluid from said mounting container to said vessel inlet, and a frame for supporting said vessel, said pump means and said valve means as a portable unit for transfer between said plurality of containers.

11. An apparatus according to claim 9, wherein said vessel is a portable structure comprising a fitting for connecting said inlet to a conduit for supplying said fluid to said vessel, wherein said mounting means is arranged to detachably support said vessel sequentially on each of said containers, and wherein each of said containers comprises a supply conduit, pump means for pumping fluid from said container to said supply conduit, and valve means for controlling the flow of fluid from said supply conduit to said vessel inlet.

12. An apparatus according to claim 8 further comprising a supply conduit connected to said vessel inlet, a bypass conduit connected to said supply conduit for recycling at least a portion of the fluid in said supply conduit to the corresponding source, and a control valve for controlling fluid flow in said bypass conduit so as to regulate the amount of fluid flow reaching said vessel inlet.

13. An apparatus according to claim 8, wherein said fluid is a liquid and said vessel is open to the atmosphere, and wherein said outlet means comprises a channel extending along the exterior of said sidewall and a weir for maintaining a predetermined liquid level in said vessel by providing an overflow for releasing to said channel liquid reaching said liquid level.

14. An apparatus according to claim 1 further comprising a plurality of containers each for containing a corresponding treating solution to be used in the treating of said objects, pump means for circulating said treating solutions, an inlet manifold for respectively connecting an output of said pump means to each of said containers, an outlet manifold for returning the corresponding solution from an outlet of said vessel to the corresponding container, remotely operable valve means for respectively connecting said inlet manifold and said outlet manifold with one of said containers at a time, an d control means for operating said valve means from a location remote therefrom.

15. An apparatus according to claim 1 further comprising a mesh screen positioned relative to said vessel inlet to prevent a discharge of said objects through said vessel inlet in the absence of said fluid stream, and a filter for filtering said fluid upstream of said mesh screen.

16. An apparatus according to claim 1 further comprising a particle trap providing a tortuous flow path upstream of said vessel inlet to prevent a discharge of said objects through said vessel inlet in the absence of said fluid stream.

17. An apparatus according to claim 1 further comprising a deflecting member mounted above said distribution shield and located in the vicinity of said disengaging position so as to intercept said upwardly flowing objects and deflect them away from said fluid stream.

18. An apparatus according to claim 17, wherein said deflecting member has an inverted conical surface for intercepting and deflecting the objects.

19. An apparatus according to claim 1, wherein said bottom wall and said distribution shield are each inclined at an angle in the range of about 20° to about 50° from the horizontal.

20. An apparatus according to claim 1, wherein the fluid in said vessel is a mixture of a liquid and a gas, and wherein said distribution shield has a lower surface which is inclined upwardly away from said fluid stream and toward said sidewall to prevent an accumulation of the gas under said distribution shield.

21. An apparatus according to claim 1 further comprising a conduit mounted in said vessel and arranged above said fluid inlet for receiving said flow of objects, wherein said conduit extends upwardly to confine the flow of said objects from said feed position at least to the upper surface of said distribution shield, wherein the said fluid in said vessel is a mixture of a liquid and a gas, and wherein vent means is provided to prevent an accumulation of the gas under said distribution shield by providing a flow path for said gas from below to above said distribution shield.

22. An apparatus for electrolytically treating a plurality of objects with an electrolytic fluid while immersed in said fluid, said objects being at least partially electrically conductive and said apparatus comprising:

a vessel having at least one bottom wall inclined downwardly from at least one sidewall toward a fluid inlet arranged to provide an upwardly directed stream of said fluid for causing said objects to flow upward from a feed position adjacent to said inlet to a disengaging position at which said objects are disengaged from said stream and from which said disengaged objects are deposited on an upper portion of said bottom wall, said bottom wall being arranged to cause a bed of said objects to move downwardly along said bottom wall away from the upper portion thereof toward said feed position;

an electrode positioned to contact said moving bed and a counterelectrode positioned to contact said fluid;

pump means for conveying said fluid from a container to said vessel inlet;

control valve means for controlling the flow of fluid from said container to said vessel inlet; and a frame for engaging said container and supporting thereon said vessel, said pump means and said valve means to provide a portable unit for transfer between a plurality of containers.

23. An apparatus according to claim 22 further comprising a distribution shield mounted in said vessel and having an upper surface inclined downwardly and extending away from the vicinity of said disengaging position to a return position above the upper portion of said inclined bottom wall, such that said disengaged objects fall on the upper surface of said distribution shield and move downwardly thereon to said return position from which they are deposited onto the upper portion of said inclined bottom wall and move downward along said inclined bottom wall toward said feed position.

24. An apparatus according to claim 23 further comprising a conduit mounted in said vessel and arranged above said fluid inlet for receiving said flow of objects, said conduit extending upwardly to confine the flow of said objects from said feed position to at least the vicinity of said distribution shield.

25. An apparatus according to claim 23, wherein said distribution shield and said counterelectrode are detachably suspended in said vessel and are removable to permit the objects in said moving bed to be removed from said vessel.

26. An apparatus according to claim 23 further comprising a deflecting member mounted above said distribution shield and located in the vicinity of said disengaging position so as to intercept said upwardly flowing objects and deflect them away from said fluid stream.

27. An apparatus according to claim 23, wherein said counterelectrode is located under said distribution shield and includes means for preventing said objects from being retained on an upper surface of said counterelectrode.

28. An apparatus according to claim 22 further comprising a deflecting member mounted below said counterelectrode so as to intercept objects carried upward by currents of said fluid and deflect them away from said counterelectrode.

29. An apparatus according to claim 22, wherein said electrode comprises a sheet of electrically conductive material covering a substantial portion of said bottom wall and arranged to contact said moving bed of objects.

30. An apparatus for contacting a plurality of objects with a fluid, said apparatus comprising:

a vessel having at least one bottom wall inclined downwardly from at least one sidewall toward a fluid inlet arranged to provide an upwardly directed stream of said fluid for causing said objects to flow upward from a feed position adjacent to said inlet to a disengaging position at which said objects are disengaged from said stream;

a distribution shield mounted in said vessel and having an upper surface inclined downwardly and extending away from the vicinity of said disengaging position to a return position such that said disengaged objects fall on the upper surface of said distribution shield and move downwardly thereon away from said disengaging position to said return position, said return position being arranged above an upper portion of said inclined bottom wall to deposit said disengaged objects onto the upper portion of said inclined bottom wall, and said inclined bottom wall being arranged to cause a bed of said deposited objects to move downward along said inclined bottom wall from the upper portion toward said feed position; and, an electrode arranged to contact said moving bed and a counterelectrode arranged to contact said fluid, said fluid being a liquid electrolyte comprising a metal for coating said objects and said objects being at least partially electrically conductive.

31. An apparatus for contacting a plurality of objects with a fluid, said apparatus comprising:

a vessel having at least one bottom wall inclined downwardly from at least one sidewall toward a fluid inlet arranged to provide an upwardly directed stream of said fluid for causing said objects to flow upward to a disengaging position from a feed position adjacent to said inlet;

a deflecting member located in the vicinity of said disengaging position for intercepting and disengaging said upwardly flowing objects from said fluid stream; and, a distribution shield mounted in said vessel and having an upper surface inclined downwardly and extending away from the vicinity of said disengaging position to a return position such that said disengaged objects fall on the upper surface of said distribution shield and move downwardly thereon away from said disengaging position to said return position, said return position being arranged above an upper portion of said inclined bottom wall to deposit said disengaged objects onto the upper portion of said inclined bottom wall, and said inclined bottom wall being arranged to cause a bed of said deposited objects to move downward along said inclined bottom wall from the upper portion toward said feed position.

* * * * *